No. 826,533. PATENTED JULY 24, 1906.
F. BROEL.
AUTOMATIC IGNITER AND EXTINGUISHER FOR GAS LAMPS.
APPLICATION FILED JAN. 28, 1905.
2 SHEETS—SHEET 1.
Fig. 1.
Fig. 2.
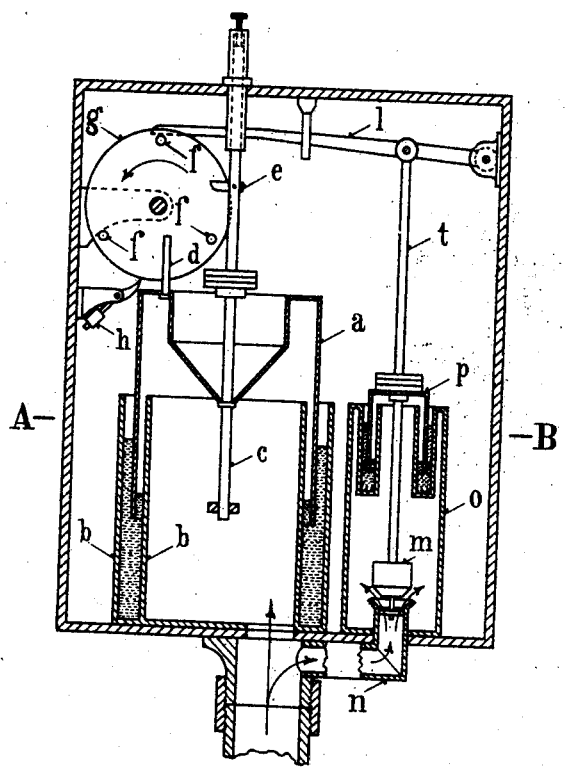
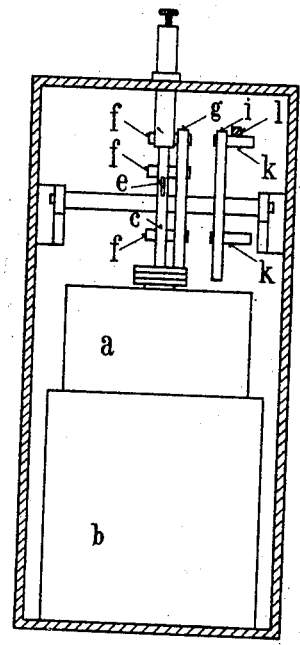
Fig. 6.
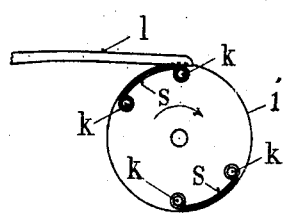
Fig. 4.
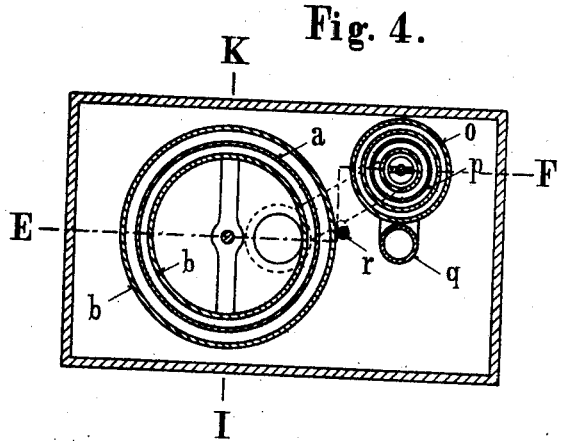
Fig. 7.
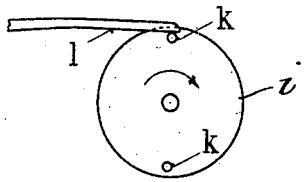
Witnesses
A. J. Haddan
G. Haddan
Inventor
Ferdinand Broel
by his Attorney R. Haddan
THE NORRIS PETERS CO., WASHINGTON, D. C.

No. 826,533. PATENTED JULY 24, 1906.
F. BROEL.
AUTOMATIC IGNITER AND EXTINGUISHER FOR GAS LAMPS.
APPLICATION FILED JAN. 28, 1905.

2 SHEETS—SHEET 2.

Witnesses
A J Haddan
T. Haddan

Inventor
Ferdinand Broel
by his Attorney R Haddan

UNITED STATES PATENT OFFICE.

FERDINAND BROEL, OF VELBERT, GERMANY.

AUTOMATIC IGNITER AND EXTINGUISHER FOR GAS-LAMPS.

No. 826,533.      Specification of Letters Patent.      Patented July 24, 1906.

Application filed January 28, 1905. Serial No. 243,091.

*To all whom it may concern:*

Be it known that I, FERDINAND BROEL, a subject of the German Emperor, residing at Velbert, Germany, have invented certain new and useful Improvements in Automatic Igniters and Extinguishers for Gas-Lamps, of which the following is a specification.

This invention relates to improvements in automatic igniters and extinguishers for gas-lamps.

Igniters and extinguishers for gas-lamps operated by the increase of gas-pressure are known, in which the valve serving for controlling the supply of gas to the burner is moved by a bell-float raised by such increase of gas-pressure. This is effected by connecting said valve to a toothed disk or to a disk having pins or pegs arranged in a circle, said disk engaging a catch connected to the float on each rising movement of the latter by means of a system of levers or the like, so that the disk is rotated and the valve operated.

The present invention relates to means for fixing the disk operating the gas-supply valve in the open or closed position, respectively, of the valve, and, further, in causing said disk to coact with a second disk, both the latter having teeth or projections for shifting the valve and arranged in such a manner that all the lamps cannot only be ignited from a central point, but also any desired number of lamps can be extinguished in an absolutely certain manner whatever the number, time, and place, as hereinafter described.

Figure 3:
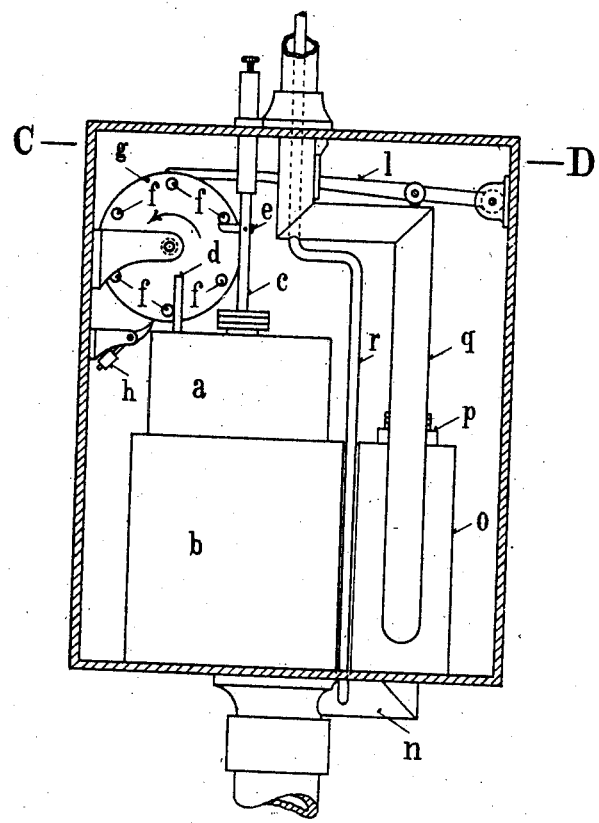
Figure 5:
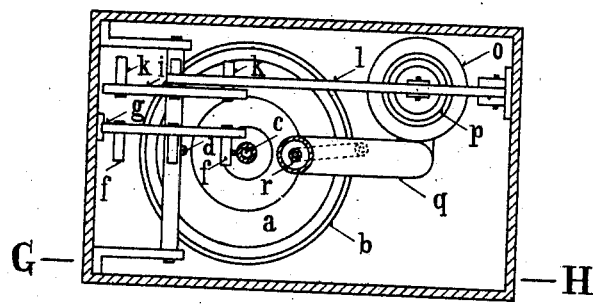

In the annexed drawings, Figure 1 shows the device in vertical section on the line E F of Fig. 4, the latter being a horizontal section on the line A B of Fig. 1. Fig. 2 is a cross-section on the line I K of Fig. 4; Fig. 3, a longitudinal section on the line G H of Fig. 5, the latter being a horizontal section on the line C D of Fig. 3. Fig. 6 shows a modification of the disk $i$ shown in the preceding figures, and Fig. 7 a second modification of such part for purposes which will be hereinafter set out.

The bell-float $a$, which is formed similarly to the known hydraulic valves, rests in its lowest position upon the bottom of the circular receiver $b$, which is filled with mercury to such a height that the gas entering the bell encounters sufficient resistance even when the gas-pressure increases to a certain extent. This bell is weighted or loaded in a funnel-shaped recess in its cover to such an extent that it cannot be raised from its lowest position by normal day-pressure existing in the main.

In the vertical axis of the bell is a lifting-rod $c$, fixed to the cover, and at one side of said rod $c$ is a short rod $d$, Figs. 1 and 3, also fixed to the cover of the bell. The lifting-rod is provided with a trip or catch lever $e$, and each end of said rod passes through suitable guides.

When the gas-pressure in the mains is increased, the bell rises and the trip or catch lever $e$ engages one of the pins $f$, arranged on a disk $g$ in the manner of teeth, and rotates said disk; but as soon as the disk has been shifted to the extent of the distance between two pins another pin $f$ abuts against the aforesaid rod $d$ and stops the disk against further movement, backward movement being also prevented by an ordinary pawl $h$, which engages a notch at a suitable point in the circumference of the disk. If the disk $g$ were not stopped by the rod $d$, it would, owing to its inertia, travel beyond the limit, since on the sudden increase of gas-pressure the bell and disk are moved somewhat rapidly. Although the travel of the bell in a downward direction can be easily limited by the bottom of the receiver $b$ and in an upward direction by a screw or the like in the rod-guide or by any other convenient means, this would not insure the fixing of the disk. The simple and reliable means for limiting the movement of the disk $g$ by the rod $d$, raised by the bell, is a principal feature of the present invention, since without this device the further action would be uncertain. On the spindle of the disk $g$ is mounted a second disk $i$, provided with pins $k$ in a similar manner to the disk $g$. As shown in the drawings, these pins are adapted to engage the free end of a lever $l$, which on being raised lifts the rod $t$ and removes the valve $m$ from its seat, thus opening the gas-supply pipe $n$. The gas now enters the valve-chamber $o$, which is kept closed by a cap or bell $p$, fixed to the rod $t$, and has its wall immersed in mercury. The gas admitted by the pipe $n$ passes through the tube $q$, leading from the valve-chamber to the burner, and is ignited by the pilot-flame, which is fed continuously from the gas-pipe by the small tube $r$. When the gas-pressure has again reached its normal or former condition, the bell $a$ also returns to its lower position and the catch-lever $e$, rotating on its pivot, slides past the other pin $f$, which has arrived in the position of the pin previously displaced and again assumes its transverse position. The disks $g$ and $i$, as well as the lever $l$ and the valve $m$, remain in the positions imparted to them by the rising of the bell, and therefore the flame continues to burn; but this would not happen were it not for the means described above, since the pin $k$ would have passed and slid from under the lever $l$ at the wrong time. When the supply of gas to the burner is to be cut off, the gas-pressure must be again increased, and the above-described movement of the disks is repeated. The pin $k$ now slides from under the end of the lever $l$. The latter falls and with it the valve $m$, so that the gas-supply pipe $n$ is closed and the burner or burners extinguished.

If the increase of pressure by which the burner is ignited is considered as the first, the burner will be extinguished at the second increase of pressure in the above-described manner, and with the arrangement of the pins $k$ on the disk $i$ as shown in Fig. 1, where three pins are arranged, the burner will be ignited again on the third increase of pressure, and so on, provided that six pins $f$ are arranged on the disk $g$. The pins $k$ are removably fixed to the disk $i$, and their number can also be increased or reduced when necessary.

When four pins $k$ are used and given the positions shown in Fig. 6, each pair must be connected by a bow $s$, so that on the second increase of pressure the burner will not be extinguished, but only at the third increase, when the lever $l$ will be able to fall; but the burner will be again ignited on the fourth increase when the lever $l$ is again raised. If two pins $k$ only are used, arranged as shown in Fig. 7, the burner is extinguished at the second increase of pressure, but is, however, not again ignited at the third, but only at the fourth increase. It is therefore quite simple to produce the desired effect by displacing the pins $k$ in the disk $i$, for instance, for igniting and extinguishing street-lamps when all the latter are to be simultaneously ignited, but some of them to be extinguished late in the evening and the rest early in the morning.

I claim—

1. In an automatic igniter and extinguisher for gas-lamps, the combination with a gas-feed and valve therein, and a bell-float in communication with said feed and adapted to be operated by increase of gas-pressure, of a rod attached to said float, a trip-lever on said rod, a rotatable pin-disk adapted to be rotated by said trip-lever on the float rising, means for limiting the rotation of said disk and means controlled by the latter for opening the gas-valve on the first increase of gas-pressure, retaining said valve in an open condition and closing same on a subsequent increase, substantially as described.

2. In an automatic igniter and extinguisher for gas-lamps the combination with a gas-feed and valve therein, and a bell-float in communication with said feed and adapted to be operated by increase of gas-pressure, of a rod attached to said float, a trip-lever on said rod, a rotatable disk, pins arranged in a circle on said disk, and adapted to engage the trip-lever to rotate the disk on the float rising, a stop for limiting the rotation of the disk and adjustable means controlled by the latter for opening the gas-valve on the first increase of gas-pressure, retaining said valve in an open condition, and closing same on a subsequent increase, substantially as described.

3. In an automatic igniter and extinguisher for gas-lamps the combination with a gas-feed and valve therein, and a bell-float in communication with said feed and adapted to be operated by increase of gas-pressure, of a rod attached to said float, a trip-lever on said rod, a pair of rotatable coacting pin-disks adapted to be rotated by said trip-lever on the float rising, means for limiting the rotation of said disks, a pivoted lever operated by one of said disks, and a rod pivoted to said lever and connected to the aforesaid valve, substantially as described, for the purpose set forth.

4. In an automatic igniter and extinguisher for gas-lamps the combination with a gas-feed and valve therein, and a bell-float in communication with said feed and adapted to be operated by increase of gas-pressure, of a rod attached to said float, a trip-lever on said rod, a pair of rotatable coacting pin-disks, the pins of one of said disks lying in the path of said trip-lever, means attached to the cover of the float for limiting the movement of the disks, a pivoted lever adapted to engage the pins of the other disk, and a rod pivoted to said lever and connected to the aforesaid valve, substantially as described for the purpose set forth.

5. In an automatic igniter and extinguisher for gas-lamps the combination with a gas-feed and valve therein, and a bell-float in communication with said feed and adapted to be operated by increase of gas-pressure, of a rod attached to said float, a trip-lever on said rod, a pair of rotatable coacting disks pins arranged in a circle on one of said disks lying in the path of said trip-lever, a stop attached to the cover of the float, removable pins on the other disk a pivoted lever adapted to engage the pins of the latter disk, and a rod pivoted to said lever and connected to the aforesaid valve substantially as described.

In witness whereof I have signed this specification in the presence of two witnesses.

FERDINAND BROEL.

Witnesses:
  WILLIAM ESSENWEIN,
  PETER LIEBER.